(12) United States Patent
Schmid et al.

(10) Patent No.: US 12,709,065 B2
(45) Date of Patent: Aug. 18, 2026

(54) OBJECTS WITH CAVITIES AND LATTICE STRUCTURES HAVING MULTIPLE STIFFNESSES

(71) Applicant: Peridot Print LLC, Palo Alto, CA (US)

(72) Inventors: Geoffrey Franklin Schmid, San Diego, CA (US); James Andrew Mccutcheon, Vancouver, WA (US); Edward Ponomarev, San Diego, CA (US)

(73) Assignee: Peridot Print LLC, Palo Alo (CA)

( * ) Notice: Subject to any disclaimer, the term of this patent is extended or adjusted under 35 U.S.C. 154(b) by 517 days.

(21) Appl. No.: 18/036,716

(22) PCT Filed: Dec. 3, 2020

(86) PCT No.: PCT/US2020/063124

§ 371 (c)(1),
(2) Date: May 12, 2023

(87) PCT Pub. No.: WO2022/119574

PCT Pub. Date: Jun. 9, 2022

(65) Prior Publication Data

US 2024/0017495 A1 Jan. 18, 2024

(51) Int. Cl.

*B29C 64/386* (2017.01)
*A43B 13/18* (2006.01)

(Continued)

(52) U.S. Cl.

CPC .......... *B29C 64/386* (2017.08); *A43B 13/186* (2013.01); *A43D 29/00* (2013.01); *B33Y 50/00* (2014.12); *B33Y 80/00* (2014.12); *G05B 19/0426* (2013.01); *A43D 2200/10* (2013.01); *B29L 2031/50* (2013.01)

(58) Field of Classification Search

CPC ... B29C 64/386; B29C 64/393; A43B 13/186; A43D 29/00; A43D 2200/10; B33Y 50/00; B33Y 80/00; B33Y 50/02; G05B 19/0426; B29L 2031/50; G06T 19/20; G06T 2219/2008; G06T 17/20

See application file for complete search history.

(56) References Cited

U.S. PATENT DOCUMENTS 10,010,133 B2 7/2018 Guyan
10,575,588 B2 3/2020 Perrault et al.

(Continued)

FOREIGN PATENT DOCUMENTS

CN 109744640 A 5/2019
CN 211186024 U 8/2020

*Primary Examiner* — Yuhui R Pan

(74) *Attorney, Agent, or Firm* — Michael Dryja

(57) ABSTRACT

According to examples, machine-readable instructions in a computer-readable medium may cause a processor to generate code representing a cavity to be formed in an object, generate code representing a first lattice structure to be formed in the object directly above the cavity, and generate code representing a second lattice structure to be formed in the object in an area adjacent to the first lattice structure, in which the first lattice structure may be stiffer than the second lattice structure. In addition, the processor may output the generated codes, in which a three-dimensional (3D) fabrication system may fabricate the object according to the generated codes.

16 Claims, 5 Drawing Sheets

(51) Int. Cl.

| | |
|---|---|
| ***A43D 29/00*** | (2006.01) |
| ***B33Y 50/00*** | (2015.01) |
| ***B33Y 80/00*** | (2015.01) |
| ***G05B 19/042*** | (2006.01) |
| *B29L 31/50* | (2006.01) |

(56) References Cited

U.S. PATENT DOCUMENTS

| | | | | |
|---|---|---|---|---|
| 2006/0277793 | A1* | 12/2006 | Hardy | A43B 13/186 36/28 |
| 2007/0017122 | A1 | 1/2007 | Feller et al. | |
| 2016/0242502 | A1 | 8/2016 | Spanks | |
| 2016/0374428 | A1 | 12/2016 | Kormann et al. | |
| 2018/0271213 | A1* | 9/2018 | Perrault | A43B 13/141 |
| 2018/0317601 | A1 | 11/2018 | Guyan | |

* cited by examiner

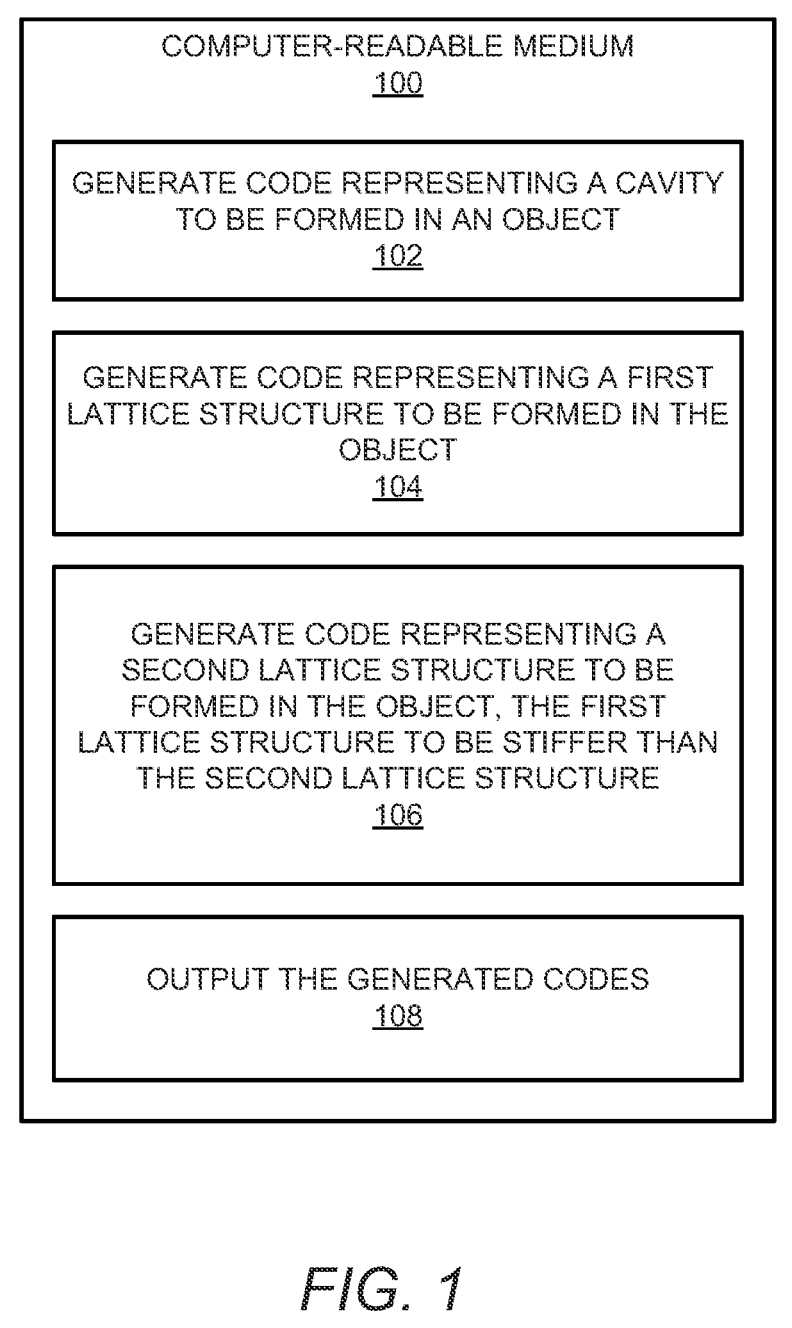

COMPUTER-READABLE MEDIUM
100

GENERATE CODE REPRESENTING A CAVITY TO BE FORMED IN AN OBJECT
102

GENERATE CODE REPRESENTING A FIRST LATTICE STRUCTURE TO BE FORMED IN THE OBJECT
104

GENERATE CODE REPRESENTING A SECOND LATTICE STRUCTURE TO BE FORMED IN THE OBJECT, THE FIRST LATTICE STRUCTURE TO BE STIFFER THAN THE SECOND LATTICE STRUCTURE
106

OUTPUT THE GENERATED CODES
108

FIG. 1

OBJECTS WITH CAVITIES AND LATTICE STRUCTURES HAVING MULTIPLE STIFFNESSES

BACKGROUND

A user may wear an article of footwear on their foot and the article of footwear may typically include an insole and an outsole. The outsole may include an upper sole, a midsole, and a bottom sole that are to cushion and protect the user's foot while the user makes contact with the ground. The midsole may generally provide most of the cushioning and shock absorption and may support different amounts of pressure at different times at various locations of the midsole when the user is walking or running.

BRIEF DESCRIPTION OF DRAWINGS

Features of the present disclosure are illustrated by way of example and not limited in the following figure(s), in which like numerals indicate like elements, in which:

FIG. 1 shows a block diagram of an example computer-readable medium that may have stored thereon computer-readable instructions for generating and outputting codes representing lattice structures to be formed in an example object, in which a 3D fabrication system is to fabricate the object according to the generated codes;

DETAILED DESCRIPTION

Figure 2A:
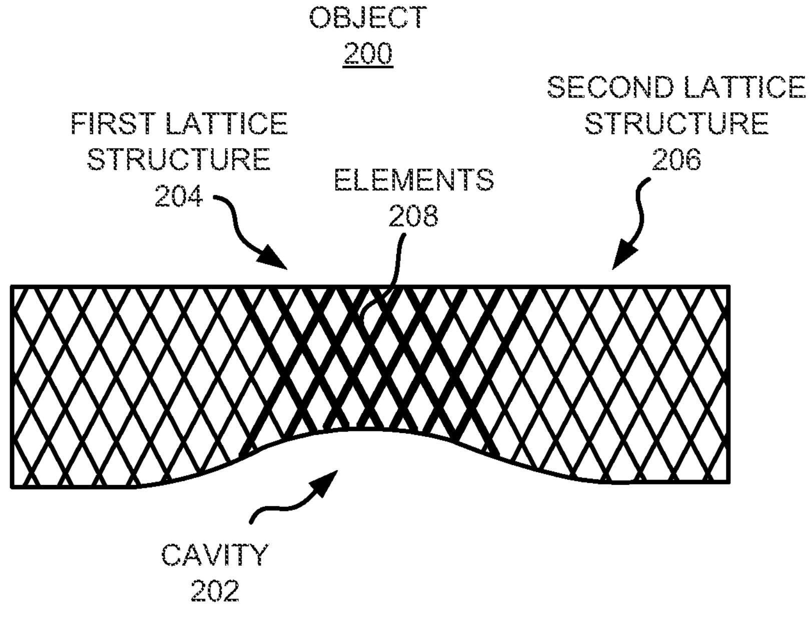
FIGS. 2A-2C, respectively, show diagrams of the example object during various stages of load on the example object.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are computer-readable media, methods, and apparatuses that may generate and output codes representing a cavity and lattice structures to be formed in an object, such as a midsole of a shoe. A processor may generate the codes representing the cavity and the lattice structures and may output the generated codes to a 3D fabrication system, which may fabricate the object to have the lattice structures according to the codes representing the lattice structures. The lattice structures may be defined as open-celled structures that may include a plurality of elements, e.g., beams, strips, slats, struts, and/or the like, interconnected to other elements at respective nodes or gaps between nodes. In other examples, the lattice structures may include elements that are formed of curved surfaces. Examples of these types of lattice structures may include gyroids, which may be defined as including triply periodic minimal surfaces. In any of these examples, the elements forming the lattice structures may be placed at angles with respect to the vertical and horizontal axes.

As discussed herein, the object may include a first lattice structure and a second lattice structure, in which the first lattice structure may be relatively stiffer than the second lattice structure. In addition, the object may have a cavity positioned directly beneath the first lattice structure that may compress when a sufficient load is applied on the first lattice structure. That is, for instance, the cavity may compress prior to the first lattice structure and thus, the first lattice structure and the cavity may cause a load that may be moving downwardly onto the first lattice structure to be decelerated in a relatively slow manner.

As additional force is applied, the first lattice structure may be compressed and may store the energy while in the compressed state. As the force is reduced, e.g., moved away from the cavity, the first lattice structure may decompress and release the stored energy, which may assist in propelling the user. In addition, as the force is applied onto the object, the second lattice structure may provide additional cushioning to a user of the object as the second lattice structure may be relatively less stiff than the first lattice structure. In some examples, the first lattice structure and the cavity may be positioned at a location of the object at which a user's heel may apply a greatest amount of force while the user is walking, running, playing a sport (such as basketball, tennis, baseball, etc.), and/or the like. In these examples, the second lattice structure may be positioned adjacent to the first lattice structure to provide greater cushioning on other parts of the user's foot, e.g., around the heel. The object may include additional lattice structures that may be relatively less stiff than the first lattice structure and the second lattice structure to provide additional cushioning to other sections of the user's foot.

The combination of the cavity, the first lattice structure, and the second lattice structure may provide support, comfort, and performance to a user of the object. In addition, as the second lattice structure may be relatively lighter than the first lattice structure, the inclusion of both the first lattice structure and the second lattice structure may result in the object being lighter in weight than if the object included larger sections of the first lattice structure.

Figure 2B:
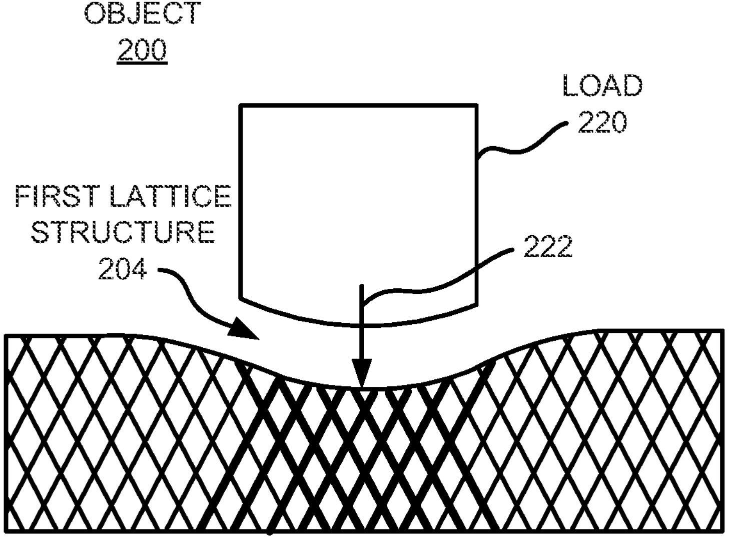
Figure 2C:
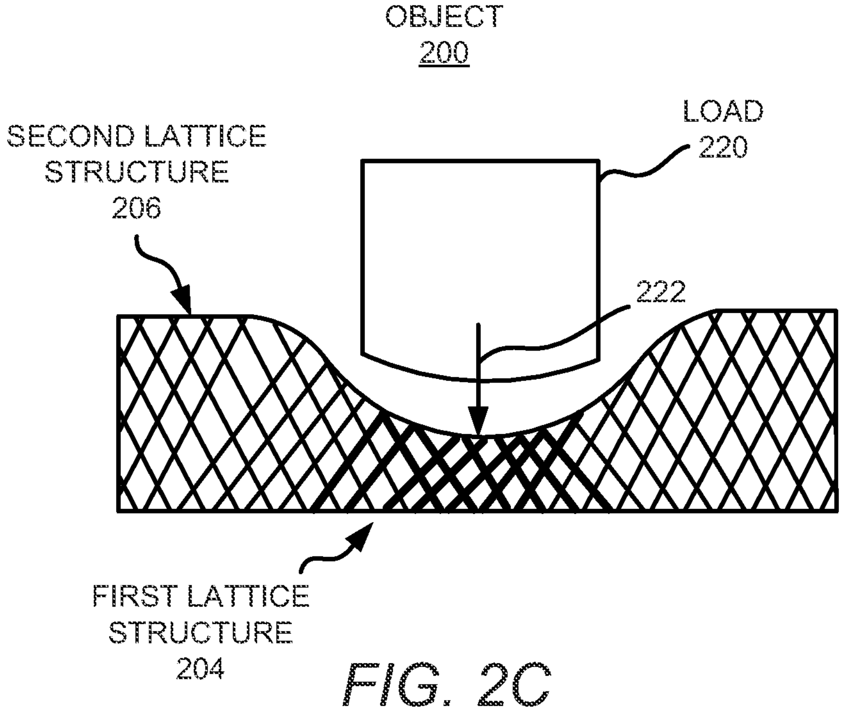

Reference is first made to FIGS. 1 and 2A-2C. FIG. 1 shows a block diagram of an example computer-readable medium 100 that may have stored thereon computer-readable instructions for generating and outputting codes representing lattice structures 204, 206 to be formed in an example object 200, in which a 3D fabrication system is to fabricate (or equivalently, print) the object 200 according to the generated codes. FIGS. 2A-2C, respectively, show diagrams of the example object 200 during various stages of load on the example object 200. It should be understood that the apparatus 100 and the object 200 may include additional features and that some of the features described herein may be removed and/or modified without departing from the scopes of the computer-readable medium 100 and/or the object 200.

Figure 5:
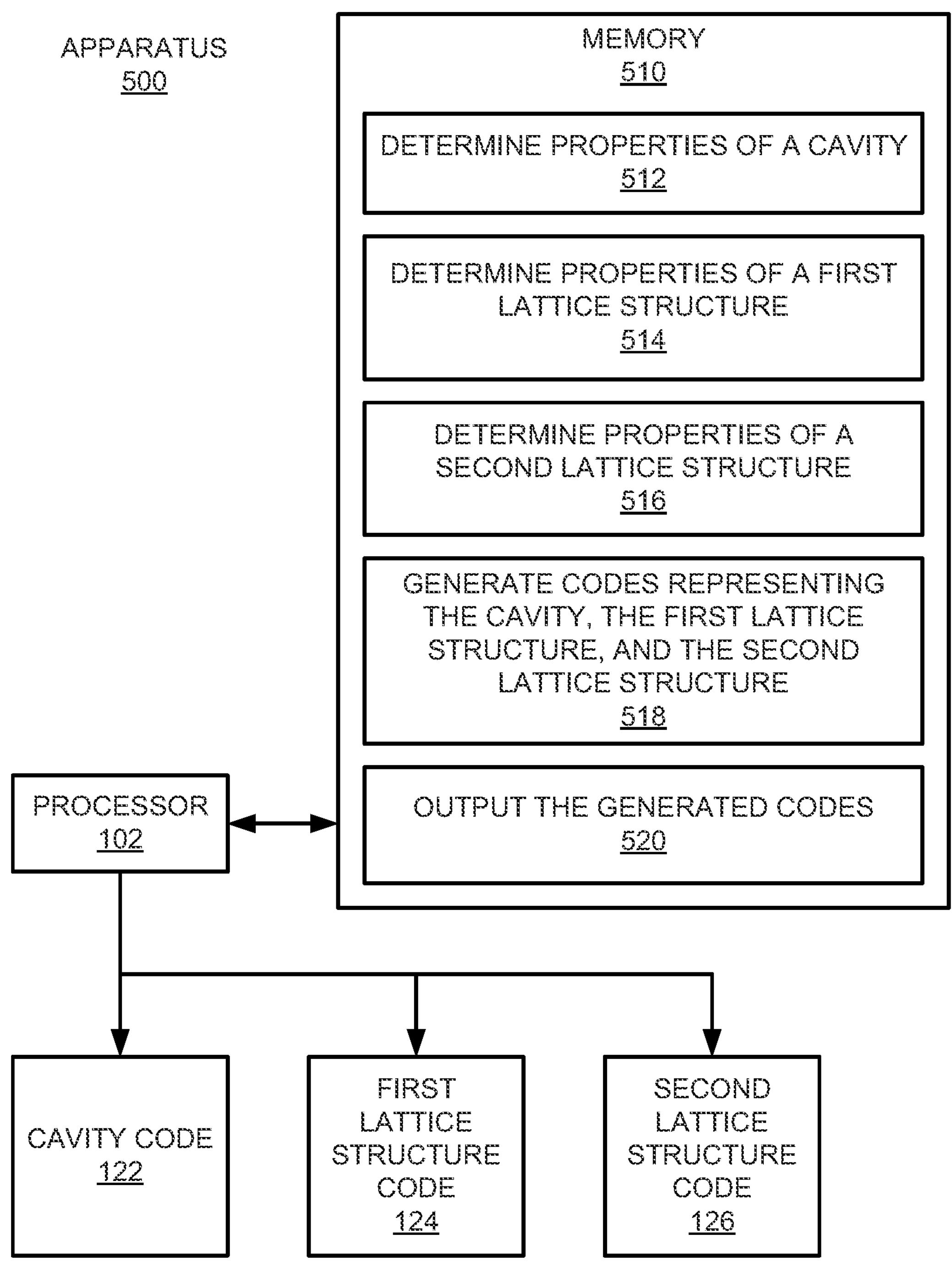
FIG. 5 depicts an example apparatus that may generate and output codes representing lattice structures to be formed in an example object, in which a 3D fabrication system is to fabricate the object according to the generated codes.

The computer-readable medium 100 may have stored thereon computer-readable instructions 102-108 that a processor, such as the processor 102 depicted in FIG. 5, may execute. The computer-readable medium 100 may be an electronic, magnetic, optical, or other physical storage device that contains or stores executable instructions. The computer-readable medium 100 may be, for example, Random Access memory (RAM), an Electrically Erasable Programmable Read-Only Memory (EEPROM), a storage device, an optical disc, and the like. The computer-readable medium 100 may be a non-transitory computer-readable storage medium, where the term "non-transitory" does not encompass transitory propagating signals.

As shown in FIG. 1, the computer-readable medium 100 may have stored thereon machine-readable instructions 102-108 that the processor 102 (shown in FIG. 5) may execute. The processor 102 may execute the instructions 102 to generate code 122 (shown in FIG. 5) representing a cavity 202 to be formed in an object 200 (shown in FIGS. 2A-2C). According to examples, the object 200 may be any type of object that is to absorb pressure or load applied onto the object 200. For instance, the object 200 may be a midsole for an article of footwear that may provide an intended amount of cushioning and/or performance to a user of the object 200. Particularly, the object 200 may be a part of a midsole that is to experience a maximum load level during use of the midsole, e.g., a part of the midsole on which a maximum amount of pressure may be applied. In these examples, the object 200 may represent a portion of the midsole at which a user's heel may impact the object 200 while the user is walking, jogging, running, playing a sport, and/or the like. In addition, or alternatively, the object 200 may represent a portion of the midsole at which a ball of a user's foot may impact the object 200 while the user is walking, jogging, running, playing a sport, and/or the like.

According to examples in which the object 200 is or is part of a midsole of an article of footwear, the object 200 may be fabricated between an upper sole (not shown) and a lower sole (not shown). In some examples, the object 200, the upper sole, and the lower sole may be fabricated as an integrated assembly. In these examples, a 3D fabrication system may fabricate the object 200, the upper sole, and the lower sole in a common build operation, e.g., during a build operation within a build chamber of the 3D fabrication system. In other examples, the object 200 may be fabricated independently from the upper sole and the lower sole. In these examples, the object 200 may be assembled with the upper sole and the lower sole through use of, for instance, an adhesive. In any of these examples, an upper portion of the object 200 may have a shape and a contour that may comfortably support a bottom of a human foot. In addition, a lower portion of the object 200 may have a shape and a contour that may match or otherwise correspond to a shape of the lower sole.

The processor 102 may execute the instructions 104 to generate code 122 (shown in FIG. 5) representing a first lattice structure 204 to be formed in the object 200 directly above the cavity 202. The processor 102 may also execute the instructions 106 to generate code 124 (shown in FIG. 5) representing a second lattice structure 206 to be formed adjacent to the first lattice structure 204. As shown in FIG. 2A, the first lattice structure 204 and the second lattice structure 206 may each be composed of a plurality of elements 208, which may be interconnecting solid lattice structures, such as beams, strips, slats, struts, surfaces, and/or the like. In examples in which the first lattice structure 204 and the second lattice structure 206 are beam based lattice structures, the elements 208 may be connected to other elements 208 at multiple nodes. In examples in which the first lattice structure 204 and the second lattice structure 206 are surface-based lattice structures, such as gyroids, the elements 208 may be curved surfaces that may intersect with other elements 208.

In some examples, interfaces between the first lattice structure 204 and the second lattice structure 206 may be continuous. In these examples, some of the elements 208 may form parts of both the first lattice structure 204 and the second lattice structure 206 to cause the interfaces to be continuous. In other examples, the first lattice structure 204 and the second lattice structure 206 may be independent from each other. In these examples, none of the elements 208 may form part of both the first lattice structure 204 and the second lattice structure 206. However, some of the elements 208 in the first lattice structure 204 may connect to some of the elements 208 in the second lattice structure 206 at some nodes in the lattice structures 204, 206.

According to examples, the first lattice structure 204 may be relatively stiffer than the second lattice structure 206. To cause the first lattice structure 204 to be relatively stiffer than the second lattice structure 206, the elements 208 forming the first lattice structure 204 may be relatively stiffer than the elements 208 forming the second lattice structure 206. In some examples, the elements 208 forming the first lattice structure 204 may have a dimension that is relatively larger, e.g., relatively thicker, than the elements 208 forming the second lattice structure 206. In addition, or alternatively, the first lattice structure 204 may have a relatively denser arrangement of elements 208 than the second lattice structure 206.

As the first lattice structure 204 may be relatively stiffer than the second lattice structure 206, the first lattice structure 204 may be more resistant to compression than the second lattice structure 206. In addition, the first lattice structure 204 may be designed and formed to cause the cavity 202 to be formed in the object 200 when the object 200 is in a normal resting state. The normal resting state may be a state in which little or no accelerating pressure is applied onto the first lattice structure 204. For instance, the normal resting state may be a state in which a user is applying static pressure onto the first lattice structure 204, such as when the user is standing on the first lattice structure 204 or is otherwise not applying accelerating pressure onto the first lattice structure 204.

The second lattice structure 206 may be relatively more compressive than the first lattice structure 204 and may thus provide greater cushioning to a user or, equivalently, a wearer of a shoe including the object 200. Thus, for instance, the second lattice structure 206 may provide greater cushioning to the user, whereas the first lattice structure 204 may provide greater energy transfer from a strike of the user's heel to the lifting of the user's heel.

According to examples, the processor 102 may determine a first stiffness level that the first lattice structure 204 is to have. In some examples, the processor 102 may receive the first stiffness level from an external source, such as an external computer. In other examples, the processor 102 may determine the first stiffness level based on various factors such as, for instance, the amount of pressure that is to be applied onto the first lattice structure 204. The first stiffness level may be a stiffness level that may provide intended levels of comfort, stability, support, and/or energy transfer.

The first stiffness level may also correspond to the size of the cavity 202. That is, the first stiffness level may be determined such that the cavity 202 and the first lattice structure 204 may be compressed when a certain amount of pressure is applied to the first lattice structure 204. The first stiffness level may be determined through testing, modeling, and/or the like. In addition, the processor 102 may determine a dimension, e.g., thicknesses, widths, etc., of the elements 208 in the first lattice structure 204 that may cause the first lattice structure 204 to have the determined first stiffness level.

In some examples, the processor 102 may determine different dimensions for the elements 208 located in different sections of the first lattice structure 204. The processor 102 may determine different dimensions such that the cavity 202 and the first lattice structure 204 may provide the intended levels of comfort, stability, support, and/or energy transfer. The processor 102 may also generate the code 124 representing the first lattice structure 204 to cause the elements 208 in the first lattice structure 204 to have the determined dimension(s).

According to examples, the processor 102 may determine a height of the cavity 202 and a height of the first lattice structure 204 may cause the cavity 202 and the first lattice structure 204 to absorb a first load level, e.g., to accommodate an amount of predicted amount of displacement. The first load level may be defined as a level of deflection and/or compression, e.g., a maximum level of deflection and/or deflection, that the first lattice structure 204 and the cavity 202 are to undergo. The first load level may be determined through testing, modeling, and/or the like, and may in some instances be individualized for a particular user. The height of the cavity 202 and the height of the first lattice structure 204 may be determined based on a type of material to be used to fabricate the first lattice structure 204 and whether any other material is to be included inside of the cavity 202.

In addition, the processor 102 may generate the code 122 representing the cavity to cause the cavity 202 to have the determined height of the cavity 202. The processor 102 may also generate the code 124 representing the first lattice structure 204 to cause the first lattice structure 204 to have the determined height of the first lattice structure 204.

According to examples, the processor 102 may determine a second stiffness level that the second lattice structure 206 is to have. In some examples, the processor 102 may receive the second stiffness level from an external source, such as an external computer. In other examples, the processor 102 may determine the second stiffness level based on various factors such as, for instance, the amount of pressure that is to be applied onto the second lattice structure 204. The second stiffness level may be a stiffness level that may be lower than the first stiffness level, and may provide intended levels of comfort, stability, support, and/or energy transfer. The second stiffness level may be determined through testing, modeling, and/or the like. In addition, the processor 102 may determine a dimension, e.g., thicknesses, widths, etc., of the elements 208 in the second lattice structure 206 that may cause the second lattice structure 206 to have the determined second stiffness level. In some examples, the processor 102 may determine different dimensions for the elements 208 located in different sections of the second lattice structure 204. The processor 102 may determine different dimensions such that the second lattice structure 206 may provide the intended levels of comfort, stability, support, and/or energy transfer.

In addition, the processor 102 may generate the code 126 (shown in FIG. 5) representing the second lattice structure 204 to cause the elements 208 in the second lattice structure 206 to have the determined dimension(s). As the second lattice structure 206 may be relatively less stiff than the first lattice structure 204, the elements 208 in the second lattice structure 206 may have relatively smaller diameters than the elements 208 in the first lattice structure 204. In other words, the processor 102 may generate the code 124 representing the first lattice structure 204 to cause the elements 208 forming the first lattice structure 204 to have larger diameters than the elements 208 forming the second lattice structure 206.

Figure 3:
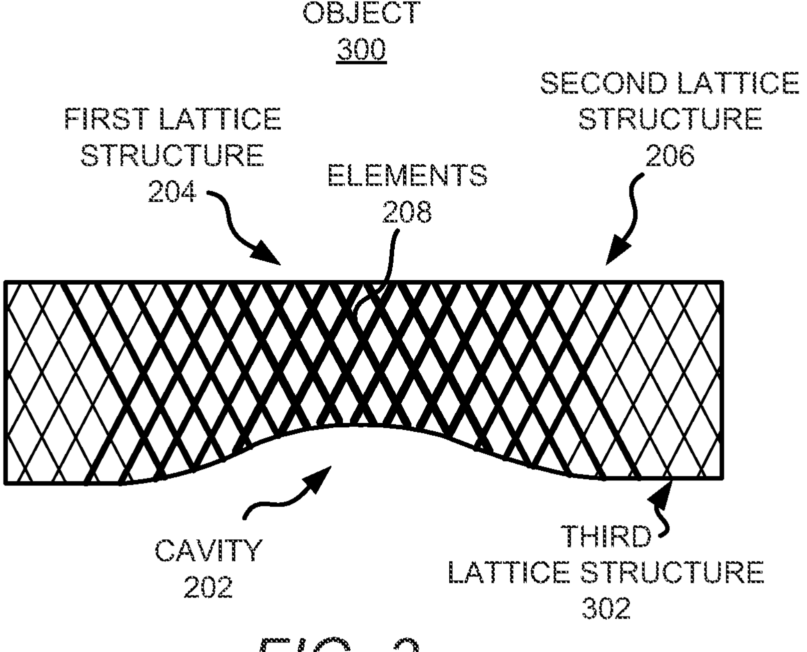
FIG. 3 depicts a diagram of an example object that may include an additional lattice structure in comparison with the example object depicted in FIGS. 2A-2C.

In some examples, and as shown in FIG. 3, an object 300 may include a third lattice structure 302 positioned outside of the second lattice structure 206 with respect to the first lattice structure 204. As shown in FIG. 3, the third lattice structure 302 may be fabricated in the object 300 in a second area adjacent to the second lattice structure 206. That is, the second lattice structure 206 may be fabricated in an area that is between the first lattice structure 204 and the third lattice structure 302. According to examples, the second lattice structure 206 may be relatively stiffer than the third lattice structure 302. For instance, the processor 102 may determine a third stiffness level that the third lattice structure 302 is to have. Similarly to the first stiffness level of the first lattice structure 204 and the second stiffness level of the second lattice structure 206, the third stiffness level may provide intended levels of comfort, stability, support, and/or energy transfer.

In addition, the processor 102 may determine a dimension, e.g., thicknesses, widths, etc., of the elements 208 in the third lattice structure 302 that may cause the third lattice structure 302 to have the determined third stiffness level. In some examples, the processor 102 may determine different dimensions for the elements 208 located in different sections of the third lattice structure 302. The processor 102 may determine different dimensions such that the third lattice structure 302 may provide the intended levels of comfort, stability, support, and/or energy transfer. For instance, the third lattice structure 302 may provide greater comfort to a user by providing greater cushioning than the first lattice structure 204 and the second lattice structure 206. In addition, the processor 102 may generate code representing the third lattice structure 302 to be fabricated in the object 300 in an area adjacent to the second lattice structure 206. The processor 102 may also or alternatively determine an additional lattice structure that may be fabricated in an area that is outside of the third lattice structure 302 with respect to the second lattice structure 206.

According to examples, the stiffness levels of the first lattice structure 204, the second lattice structure 206, and/or the third lattice structure 302 may be determined concurrently with respect to each other. In these examples, the determinations may be made concurrently such that the transfer of energy between the lattice structures 204, 206, and/or 302 may be taken into consideration in determining the intended stiffness levels of the lattice structures 204, 206, and/or 302.

The dimensions of the elements 208 forming the first lattice structure 204 and the second lattice structure 206 may be determined through testing, modeling, and/or the like. In some examples, the dimensions of the elements 208 may be determined for individual users as well as for right and left feet. That is, for instance, the dimensions of the elements 208 may be determined based on the weight of a user, a gait of the user, a running style of the user, a width and/or length of the user's foot, whether the object 200 is for a left or a right article of footwear, and/or the like.

As discussed herein, the first lattice structure 204 may be positioned directly above the cavity 202. As shown in FIG. 2B, when a load 220 is placed on the first lattice structure 204 as denoted by the arrow 222, the cavity 202 may be compressed prior to the first lattice structure 204 being compressed. However, as additional load is placed on the first lattice structure 204, as shown in FIG. 2C, the first lattice structure 204 may compress. The second lattice structure 206 (and/or the third lattice structure 302) may also begin to compress as the load 220 is initially applied and/or additional load 220 is applied. A result of this succession of compression may be that the load 220 may be decelerated in a relatively slow manner, which may provide cushioning and comfort of a user of the object 200.

When a user is walking, running, playing sports, and/or the like, on the object 200, the load 220 may be applied onto the first lattice structure 204 when the heel of the user is moved toward the ground. As the user's heel is raised, the first lattice structure 204 may move in a direction generally opposite the direction of the arrow 222. That is, the first lattice structure 204 may decompress and energy may be returned, which may propel the user's heel in an upward and/or a forward direction. The return of the energy during decompression may provide propulsive force onto the user's foot. In addition, the cavity 202 may be filled with air when the first lattice structure 204 is decompressed.

The cavity 202 may have any suitable cross-sectional shape, such as a dome shape, a channel shape, etc. In some examples, the cavity 202 may include a compressible material, such as a foam, a rubber, and/or the like. The determination as to whether the cavity 202 is empty or includes a certain compressible material may be based on a level of compressibility that the object 200 is to have. Other properties of the cavity 202, such as the height, width, curvature, and/or the like, may also be based on the compressibility level that the object 200 is to have. The compressibility level (or equivalently, cushioning) of the cavity 202, and thus, the properties of the cavity 202, may be based on testing, individual user comfort levels, and/or the like. In any regard, the first lattice structure 204 may be contoured or otherwise shaped such that the cavity 202 is formed beneath the first lattice structure 204.

The code 122 representing the cavity 202, the code 124 representing the first lattice structure 204, and the code 126 representing the second lattice structure 206 may each be a set of computer-readable instructions. For instance, the codes 122-126 may each be data respectively representing the cavity 202, the first lattice structure 204, and the second lattice structure 206. The codes 122-126 may be generated through execution of a program, such as a graphical design program, a CAD program, and/or the like. In other examples, the processor 102 may generate the codes 122-126 outside of such a program.

With reference back to FIG. 1, the processor 102 may execute the instructions 108 to output the generated codes 122-126, in which a three-dimensional (3D) fabrication system is to fabricate the object 200 according to the generated codes 122-126. In some examples, the processor 102 may output the generated codes 122-126 directly to the 3D fabrication system. In addition, or alternatively, the processor 102 may output the generated codes 122-126 to a data store and the 3D fabrication system may access the generated codes 122-126 from the data store.

Fabrication components in the 3D fabrication system (not shown) may fabricate the cavity 202, the first lattice structure 204, and the second lattice structure 206 according to the respectively generated codes 122-126. That is, a controller of the 3D fabrication system may control the fabrication components to fabricate the first lattice structure 204 to have certain dimensions as defined in the first lattice structure code 124 and the cavity code 122. The controller of the 3D fabrication system may also control the fabrication components to fabricate the second lattice structure 206 to have certain dimensions as defined in the second lattice structure code 126. In some examples, the codes 122-126 may be converted or otherwise be processed, e.g., via a printing pipeline, to be in forms that the controller of the 3D fabrication system may use to fabricate the cavity 202, the first lattice structure 204, and the second lattice structure 206.

The 3D fabrication system may fabricate the object 200 from any suitable type of material such as thermoplastic urethane (TPU), polypropylene (PP), polyether block amide, polyamide PA11, PA12, and/or the like. In some examples, the fabrication components of the 3D fabrication system may selectively apply a binding agent or a fusing agent onto build material powder to fabricate the object. The fabrication components may also selectively apply a detailing agent. In addition or alternatively, the fabrication components may include an energy source that may selectively apply energy onto build material powder to fabricate the object. The fabrication components may alternatively include other types of components that may fabricate the object 200 through an additive manufacturing technique, such as selective laser sintering, selective laser ablation, fused deposition modeling, and/or the like.

Figure 4:
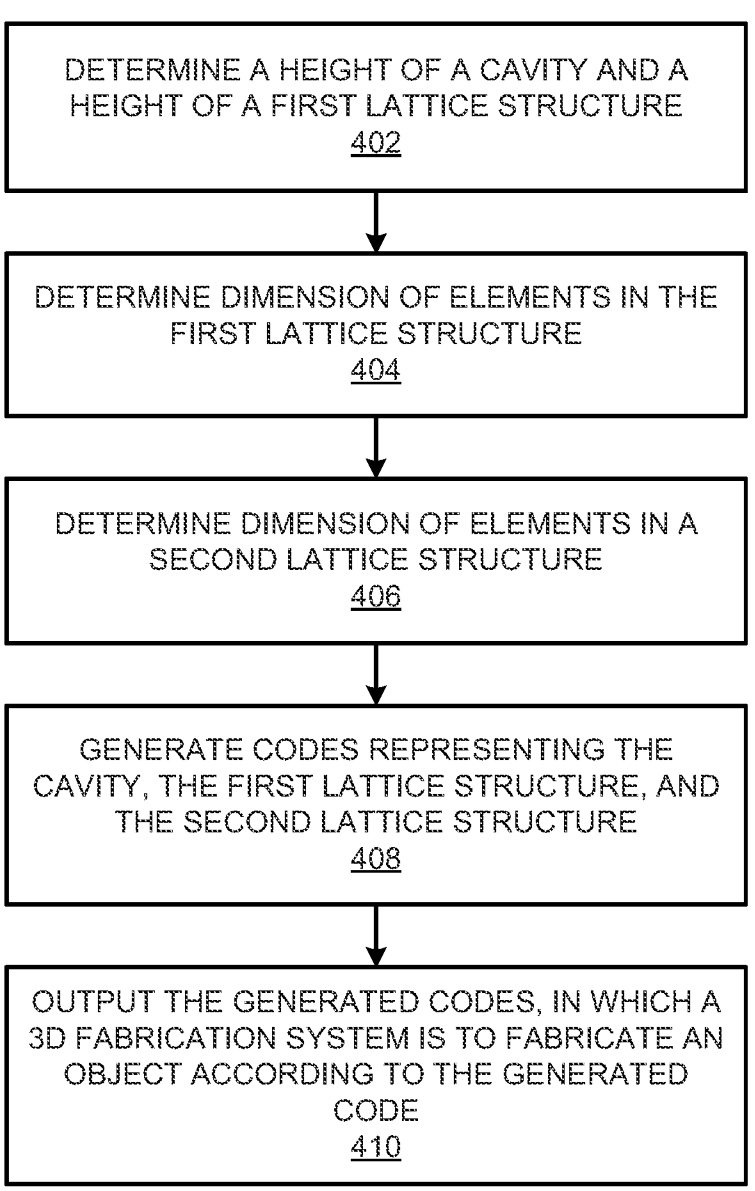
FIG. 4 depicts a flow diagram of an example method for generating and outputting codes representing lattice structures to be formed in an example object, in which a 3D fabrication system is to fabricate the object according to the generated codes.

Various manners in which the processor 102 of the apparatus 100 may operate are discussed in greater detail with respect to the method 400 depicted in FIG. 4. Particularly, FIG. 4 depicts a flow diagram of an example method 400 for generating and outputting codes 122-126 representing lattice structures 204, 206 to be formed in an example object 200, in which a 3D fabrication system is to fabricate the object 200 according to the generated codes 122-126. It should be understood that the example method 400 may include additional operations and that some of the operations described herein may be removed and/or modified without departing from the scope of the method 400. The description of the method 400 is made with reference to the features depicted in FIGS. 1-3 for purposes of illustration.

At block 402, the processor 102 (shown in FIG. 5) may determine a height of a cavity 202 and a height of a first lattice structure 204 in a first section of a to be fabricated shoe midsole. The shoe midsole may be equivalent to the object 200 depicted in FIGS. 2A-2C. In addition, the cavity 202 and the first lattice structure 204 may cause the first section to absorb a first load level and the first lattice structure 204 may be fabricated directly above the cavity 202. The first section of the shoe midsole 200 may include, for instance, the section of the shoe midsole 200 at which the cavity 202 and the first lattice structure 204 are to be fabricated. For instance, the first section may correspond to a heel position of the midsole 200.

At block 404, the processor 102 may determine a dimension of elements 208 in the first lattice structure 204 that is to cause the first lattice structure 204 to have a first stiffness level. At block 406, the processor 102 may determine a dimension of elements in a second lattice structure 206 that is to cause the second lattice structure 206 to have a second stiffness level, in which the second lattice structure 206 is to be fabricated adjacent to the first lattice structure 204. The first stiffness level may be higher than the second stiffness level and the processor 102 may make the determinations of the dimensions of the elements 208 in the first lattice structure 204 and the second lattice structure 206 in any of the manners discussed herein. As discussed herein, the processor 102 may determine the dimension of elements 208 in the first lattice structure 204 by determining a thickness of the elements 208 in the first lattice structure 204 that is to cause the first lattice structure 204 to have the first stiffness level and determining the dimension of the elements 208 in the second lattice structure 206 by determining a thickness of the elements in the second lattice structure that is to cause the second lattice structure to have the second stiffness level.

In some examples, the processor 102 may also determine a dimension of elements 208 in a third lattice structure 302 that may cause the third lattice structure to have a third stiffness level, in which the third lattice structure is to be fabricated adjacent to the second lattice structure and the third stiffness level is lower than the second stiffness level.

At block 408, the processor 102 may generate codes 122-126 representing the cavity 202, the first lattice structure 204, and the second lattice structure 206. In addition, the processor 102 may output the generated codes 122-126, in which a 3D fabrication system is to fabricate the shoe midsole 200 according to the generated codes.

Some or all of the operations set forth in each of the method 400 may be included as utilities, programs, or subprograms, in any desired computer accessible medium. In addition, the method 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 5, there is shown an example apparatus 500 that may generate and output codes representing lattice structures 204, 206 to be formed in an example object 200, in which a 3D fabrication system is to fabricate the object 200 according to the generated codes. It should be understood that the apparatus 500 may include additional features and that some of the features described herein may be removed and/or modified without departing from the scope of the apparatus 500.

According to examples, the apparatus 500 may be a computing device, such as a desktop computer, a laptop computer, a tablet computer, a server computer, and/or the like. In other examples, the apparatus 500 may be part of a 3D fabrication system, such as a controller of the 3D fabrication system. In any of these examples, the apparatus 500 may include a processor 102 that may control operations of the apparatus 500 and a memory 510 on which data that the processor 102 may access and/or may execute may be stored. The processor 102 may be a semiconductor-based microprocessor, a central processing unit (CPU), an application specific integrated circuit (ASIC), a field-programmable gate array (FPGA), and/or other hardware device. The memory 510, which may also be termed a computer readable medium, may be, for example, a Random Access memory (RAM), an Electrically Erasable Programmable Read-Only Memory (EEPROM), a storage device, or the like. The memory 510 may be a non-transitory computer readable storage medium, where the term "non-transitory" does not encompass transitory propagating signals. In any regard, the memory 510 may have stored thereon machine-readable instructions that the processor 102 may execute.

Although the apparatus 500 is depicted as having a single processor 102, it should be understood that the apparatus 500 may include additional processors and/or cores without departing from a scope of the apparatus 500. In this regard, references to a single processor 502 as well as to a single memory 510 may be understood to additionally or alternatively pertain to multiple processors 102 and multiple memories 510. In addition, or alternatively, the processor 102 and the memory 510 may be integrated into a single component, e.g., an integrated circuit on which both the processor 102 and the memory 510 may be provided. In addition, or alternatively, the operations described herein as being performed by the processor 102 may be distributed across multiple apparatuses 500 and/or multiple processors 102.

As shown in FIG. 5, the memory 510 may have stored thereon instructions 512-520 that the processor 102 may execute. Although the instructions 512-520 are described herein as being stored on the memory 510 and may thus include a set of machine-readable instructions, the apparatus 500 may include hardware logic blocks that may perform functions similar to the instructions 512-520. For instance, the processor 102 may include hardware components that may execute the instructions 512-520. In other examples, the apparatus 500 may include a combination of instructions and hardware logic blocks to implement or execute functions corresponding to the instructions 512-520. In any of these examples, the processor 102 may implement the hardware logic blocks and/or execute the instructions 512-520. As discussed herein, the apparatus 500 may also include additional instructions and/or hardware logic blocks such that the processor 102 may execute operations in addition to or in place of those discussed herein.

The processor may fetch, decode, and execute the instructions 512 to determine properties of a cavity 202 that is to be formed in a shoe midsole 200 at a first location at which the shoe midsole 200 is to experience a maximum load level during use. For instance, the first location may correspond to a heel position of the shoe midsole 200. In addition, the properties of the cavity 202 may include, for instance, the height of the cavity 202, the width of the cavity 202, the shape of the cavity 202, and/or the like.

The processor may fetch, decode, and execute the instructions 514 to determine properties of a first lattice structure 204 that is to be fabricated directly above the cavity 202. The properties of the of the first lattice structure 204 may include, for instance, the height of the first lattice structure 204, the density of the elements 208 forming the first lattice structure 204, the diameters (e.g., thicknesses) of the elements 208, and/or the like. In addition, the properties of the cavity 202 and the properties of the first lattice structure 204 may be determined to cause the first location to absorb a first level of load.

The processor 102 may fetch, decode, and execute the instructions 516 to determine properties of a second lattice structure 206 that is to be formed at a second location that is directly outside of the first location. The properties of the second lattice structure 206 may include, for instance, the height of the second lattice structure 206, the density of the elements 208 forming the second lattice structure 206, the diameters (e.g., thicknesses) of the elements 208, and/or the like. In addition, the properties of the second lattice structure 206 may cause the second location to absorb a second level of load, in which the second level of load may be lower than the first level of load;

The processor 102 may fetch, decode, and execute the instructions 518 to generate codes 122-126 representing the cavity 202, the first lattice structure 204, and the second lattice structure 206. In addition, the processor 102 may fetch, decode, and execute the instructions 520 to output the generated codes 122-126, in which a 3D fabrication system is to fabricate the shoe midsole 200 according to the generated codes 122-126 as discussed herein.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A non-transitory computer-readable medium storing instructions that when executed by a processor, cause the processor to:

generate code representing a compressible cavity to be formed in an object, such the compressible cavity compresses under sufficient compression of the object responsive to a corresponding applied load;

generate code representing a first lattice structure to be formed in the object directly above the compressible cavity, wherein responsive to the corresponding applied load, the compressible cavity compresses prior to the first lattice structure compressing;

generate code representing a second lattice structure to be formed in the object in an area adjacent to the first lattice structure, wherein the first lattice structure is stiffer than the second lattice structure; and output the generated codes, wherein a three-dimensional (3D) fabrication system is to fabricate the object according to the generated codes.

2. The non-transitory computer-readable medium of claim 1, wherein the instructions further cause the processor to:

determine a first stiffness level that the first lattice structure is to have; and determine a dimension of elements in the first lattice structure to cause the first lattice structure to have the determined first stiffness level, wherein the code representing the first lattice structure is generated to cause the elements in the first lattice structure to have the determined dimension.

3. The non-transitory computer-readable medium of claim 2, wherein the instructions further cause the processor to:

determine a height of the compressible cavity and a height of the first lattice structure that are to cause the compressible cavity and the first lattice structure to absorb a first load level, wherein the code representing the compressible cavity is generated to cause the compressible cavity to have the determined height of the compressible cavity, and wherein the code representing the first lattice structure is generated to cause the first lattice structure to have the determined height of the first lattice structure.

4. The non-transitory computer-readable medium of claim 1, wherein the instructions further cause the processor to:

determine a second stiffness level that the second lattice structure is to have; and determine a dimension of elements in the second lattice structure to cause the second lattice structure to have the determined second stiffness level, wherein the code representing the second lattice structure is generated to cause the elements in the second lattice structure to have the determined dimension.

5. The non-transitory computer-readable medium of claim 1, wherein the code representing the first lattice structure is generated to cause elements in the first lattice structure to have larger diameters than elements in the second lattice structure.

6. The non-transitory computer-readable medium of claim 1, wherein the instructions further cause the processor to:

generate code representing a third lattice structure to be fabricated in the object in a second area adjacent to the second lattice structure, wherein the second lattice structure is stiffer than the third lattice structure.

7. The non-transitory computer-readable medium of claim 1, wherein the object comprises a midsole of a shoe, and wherein the compressible cavity is to be located at a heel position of the midsole, a ball position of the midsole, or both the heel position and the ball position.

8. The non-transitory computer-readable medium of claim 1, wherein the compressible cavity comprises a dome shape or a channel shape.

9. A method comprising:

determining, by a processor, a height of a compressible cavity and a height of a first lattice structure in a first section of a shoe midsole to be fabricated, wherein the compressible cavity and the first lattice structure are to cause the first section to absorb a first load level, the first lattice structure to be fabricated directly above the compressible cavity, and the compressible cavity compresses under sufficient compression of the first section of the shoe midsole responsive to a corresponding applied load, where responsive to the corresponding applied load, the compressible cavity compresses prior to the first lattice structure compressing;

determining, by the processor, a dimension of elements in the first lattice structure that is to cause the first lattice structure to have a first stiffness level;

determining, by the processor, a dimension of elements in a second lattice structure that is to cause the second lattice structure to have a second stiffness level, wherein the second lattice structure is to be fabricated adjacent to the first lattice structure;

generating, by the processor, codes representing the compressible cavity, the first lattice structure, and the second lattice structure; and causing a three-dimensional (3D) fabrication system to fabricate the shoe midsole according to the generated codes.

10. The method of claim 9, wherein the first stiffness level is higher than the second stiffness level, and wherein the first section corresponds to a heel position of the midsole.

11. The method of claim 9, wherein determining the dimension of elements in the first lattice structure comprises determining a thickness of the elements in the first lattice structure that is to cause the first lattice structure to have the first stiffness level, and wherein determining the dimension of the elements in the second lattice structure comprises determining a thickness of the elements in the second lattice structure that is to cause the second lattice structure to have the second stiffness level.

12. The method of claim 9, further comprising:

determining, by a processor, a dimension of elements in a third lattice structure that is to cause the third lattice structure to have a third stiffness level, wherein the third lattice structure is to be fabricated adjacent to the second lattice structure and the third stiffness level is lower than the second stiffness level.

13. A three-dimensionally (3D) printed object comprising:

a first lattice structure;

a compressible cavity formed beneath the first lattice structure, such the compressible cavity compresses under sufficient compression of the 3D printed object responsive to a corresponding applied load, wherein responsive to the corresponding applied load, the compressible cavity compresses prior to the first lattice structure compressing;

a second lattice structure formed in an area adjacent to the first lattice structure, wherein the first lattice structure is stiffer than the second lattice structure.

14. The 3D printed object of claim 13, wherein the first lattice structure and the second lattice structure comprise elements, and wherein the elements forming the first lattice structure are thicker than the elements forming the second lattice structure.

15. The 3D printed object of claim 13, wherein the 3D printed object comprises a midsole of a shoe, and wherein the first lattice structure and the compressible cavity are located at a heel position of the midsole, a ball position of the midsole, or both the heel position and the ball position.

16. The non-transitory computer-readable medium of claim 1, wherein the instructions further cause the processor to:

cause the 3D fabrication system to fabricate the object according to the generated codes.

* * * * *